(12) United States Patent
Suryanarayana et al.

(10) Patent No.: US 11,748,116 B2
(45) Date of Patent: Sep. 5, 2023

(54) MANAGING VIRTUAL SERVICES IN AN INFORMATION HANDLING SYSTEM

(71) Applicant: Dell Products L.P., Round Rock, TX (US)

(72) Inventors: Shekar Babu Suryanarayana, Bangalore (IN); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 289 days.

(21) Appl. No.: 17/335,713

(22) Filed: Jun. 1, 2021

(65) Prior Publication Data
US 2022/0382561 A1    Dec. 1, 2022

(51) Int. Cl.
G06F 9/445     (2018.01)
G06F 9/455     (2018.01)
G06F 13/36     (2006.01)
G06F 12/10     (2016.01)

(52) U.S. Cl.
CPC ...... *G06F 9/44505* (2013.01); *G06F 9/45558* (2013.01); *G06F 12/10* (2013.01); *G06F 13/36* (2013.01); *G06F 2009/45595* (2013.01); *G06F 2212/152* (2013.01)

(58) Field of Classification Search
CPC .. G06F 9/44505; G06F 9/45558; G06F 12/10; G06F 13/36; G06F 2009/45595; G06F 2212/152; G06F 12/1441; G06F 2212/1016; G06F 2212/1052; G06F 2212/657; G06F 2009/45579; G06F 2009/45587; G06F 2009/4557; G06F 2009/45562; G06F 9/5077; G06F 2201/815; G06F 2009/45575; G06F 9/45533; G06F 11/1484
USPC ............ 718/1, 100, 104, 105, 103; 713/1, 2, 713/100; 710/15
See application file for complete search history.

(56) References Cited

U.S. PATENT DOCUMENTS

| | | | | |
|---|---|---|---|---|
| 10,133,619 | B1* | 11/2018 | Nagpal | G06F 11/079 |
| 11,385,922 | B2* | 7/2022 | Savir | G06F 9/5077 |
| 2018/0321879 | A1* | 11/2018 | Lu | G06F 3/06 |
| 2020/0293206 | A1* | 9/2020 | Isozaki | H04L 9/088 |
| 2021/0064525 | A1* | 3/2021 | Tian | G06F 12/1081 |
| 2021/0263761 | A1* | 8/2021 | Tsirkin | G06F 9/45558 |

* cited by examiner

Primary Examiner — Faisal M Zaman
(74) Attorney, Agent, or Firm — McDermott Will & Emery LLP

(57) ABSTRACT

In one embodiment, a method for method for managing a virtual service in an information handling system includes: identifying, by a virtual image of a plurality of virtual images of the virtual service, a device setting to be modified, the device setting associated with a device of the information handling system, each of the plurality of virtual images having respective device settings; accessing, by a host service, a protected namespace of a plurality of protected namespaces, the protected namespace associated with the virtual image; identifying, by the host service, a device index stored in the protected namespace, the device index pointing to a device-specific function associated with the device, the device-specific function stored in a translation table; accessing, by the host service, the device-specific function stored in the translation table based on the device index; and causing, by the host service, the device-specific function to modify the device setting.

20 Claims, 3 Drawing Sheets

MANAGING VIRTUAL SERVICES IN AN INFORMATION HANDLING SYSTEM

BACKGROUND

Field of the Disclosure

The disclosure relates generally to information handling systems, and in particular to managing virtual services in an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a method for managing a virtual service in an information handling system includes: identifying, by a virtual image of a plurality of virtual images of the virtual service, a device setting to be modified, the device setting associated with a device of the information handling system, each of the plurality of virtual images having respective device settings; accessing, by a host service of the virtual service, a protected namespace of a plurality of protected namespaces, the protected namespace associated with the virtual image; identifying, by the host service, a device index stored in the protected namespace, the device index pointing to a device-specific function associated with the device, the device-specific function stored in a translation table; accessing, by the host service, the device-specific function stored in the translation table based on the device index; and causing, by the host service, the device-specific function to modify the device setting.

In one or more of the disclosed embodiments, accessing the protected namespace associated with the virtual image includes: identifying, by the host service, a signature associated with the virtual image, the signature indicating that the virtual image has been validated; determining, by the host service, that the virtual image has been validated based on the signature; identifying, by the host service, an object identifier associated with the virtual image; and selecting, by the host service, the protected namespace from the plurality of protected namespaces based on the object identifier.

In one or more of the disclosed embodiments, identifying the device index stored in the protected namespace includes: identifying, by the host service, a device identifier associated with the device having the device setting to be modified; and accessing, by the host service, device attributes associated with the device stored in the protected namespace based on the device identifier, the device attributes including the device index.

In one or more of the disclosed embodiments, each of the plurality of protected namespaces is associated with a respective virtual image of the plurality of virtual images.

In one or more of the disclosed embodiments, each of the plurality of protected namespaces is generated by an embedded operating system of the information handling system during a translation phase of the information handling system.

In one or more of the disclosed embodiments, the translation table is generated by a basic input/output system (BIOS) of the information handling system, the translation table based on metadata stored in a plurality of partitions within in a memory of the information handling system, each of the plurality of partitions associated with a respective virtual image of the plurality of virtual images.

In one or more of the disclosed embodiments, the translation table is generated by the BIOS during a pre-boot phase of the information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
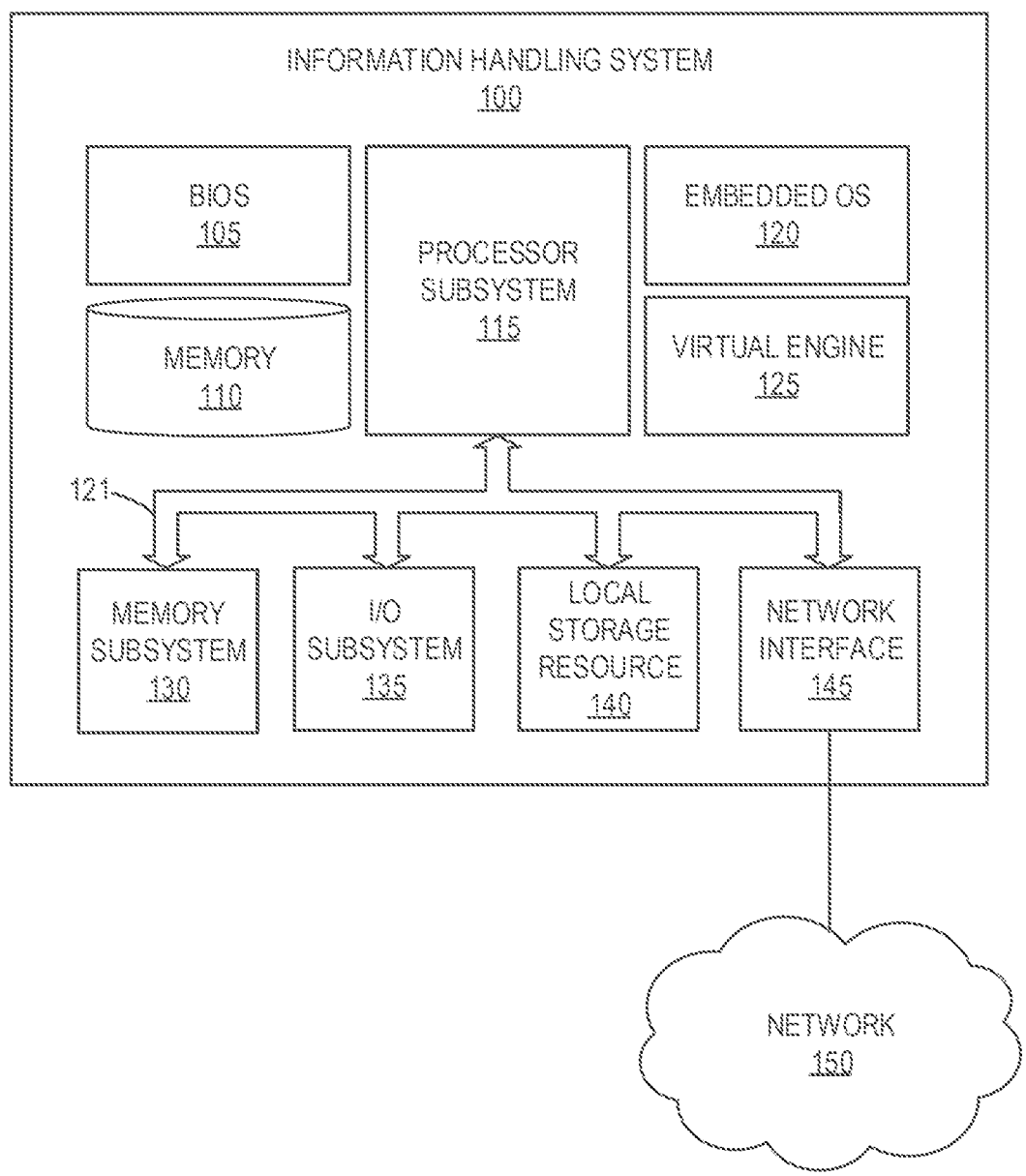
FIG. 1 is a block diagram of selected elements of an embodiment of a computing environment that includes an information handling system.

This document describes a method for managing a virtual service in an information handling system that includes: identifying, by a virtual image of a plurality of virtual images of the virtual service, a device setting to be modified, the device setting associated with a device of the information handling system, each of the plurality of virtual images having respective device settings; accessing, by a host service of the virtual service, a protected namespace of a plurality of protected namespaces, the protected namespace associated with the virtual image; identifying, by the host service, a device index stored in the protected namespace, the device index pointing to a device-specific function associated with the device, the device-specific function stored in a translation table; accessing, by the host service, the device-specific function stored in the translation table based on the device index; and causing, by the host service, the device-specific function to modify the device setting.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
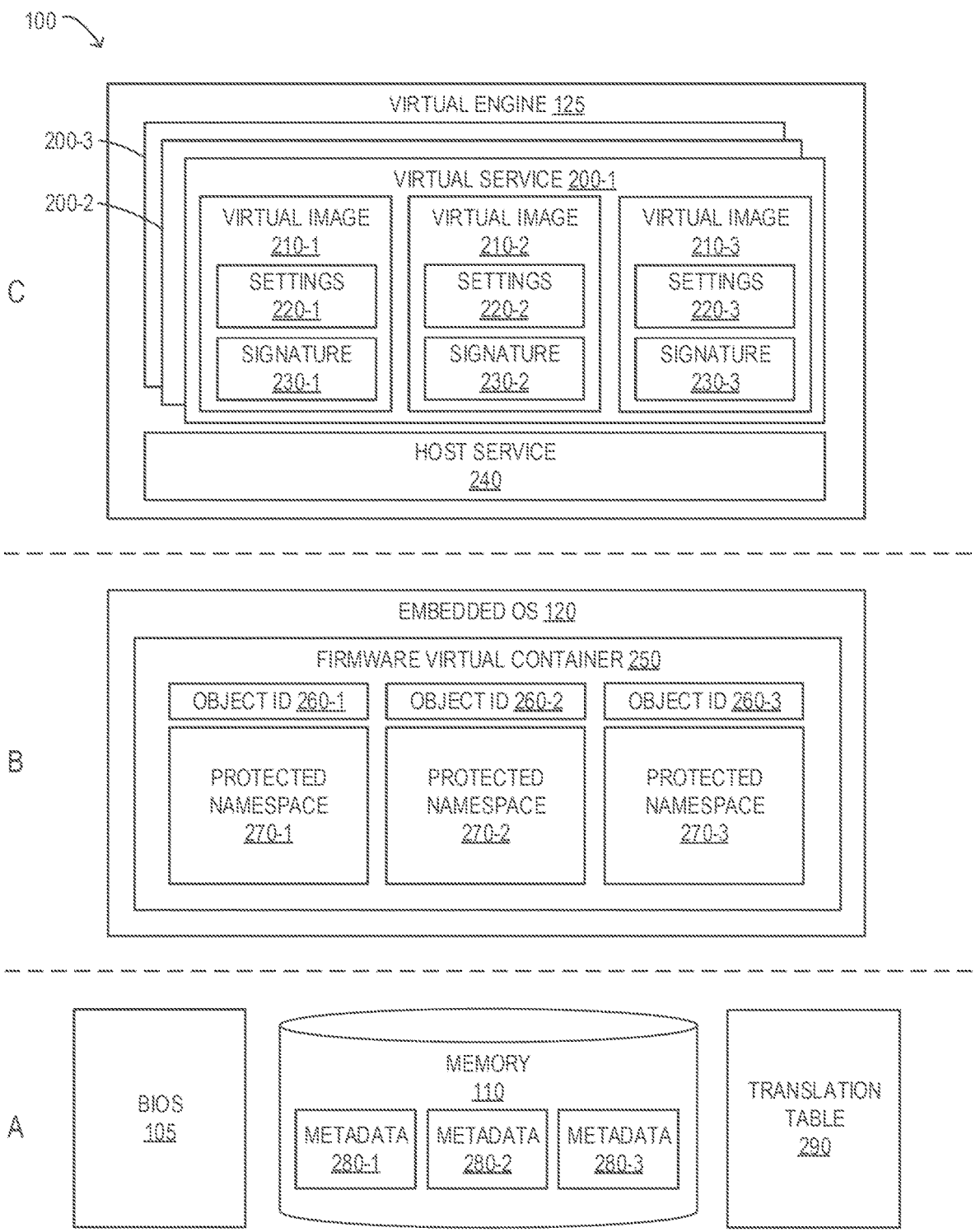
FIG. 2 is a block diagram of selected elements of an embodiment of an information handling system.
Figure 3:
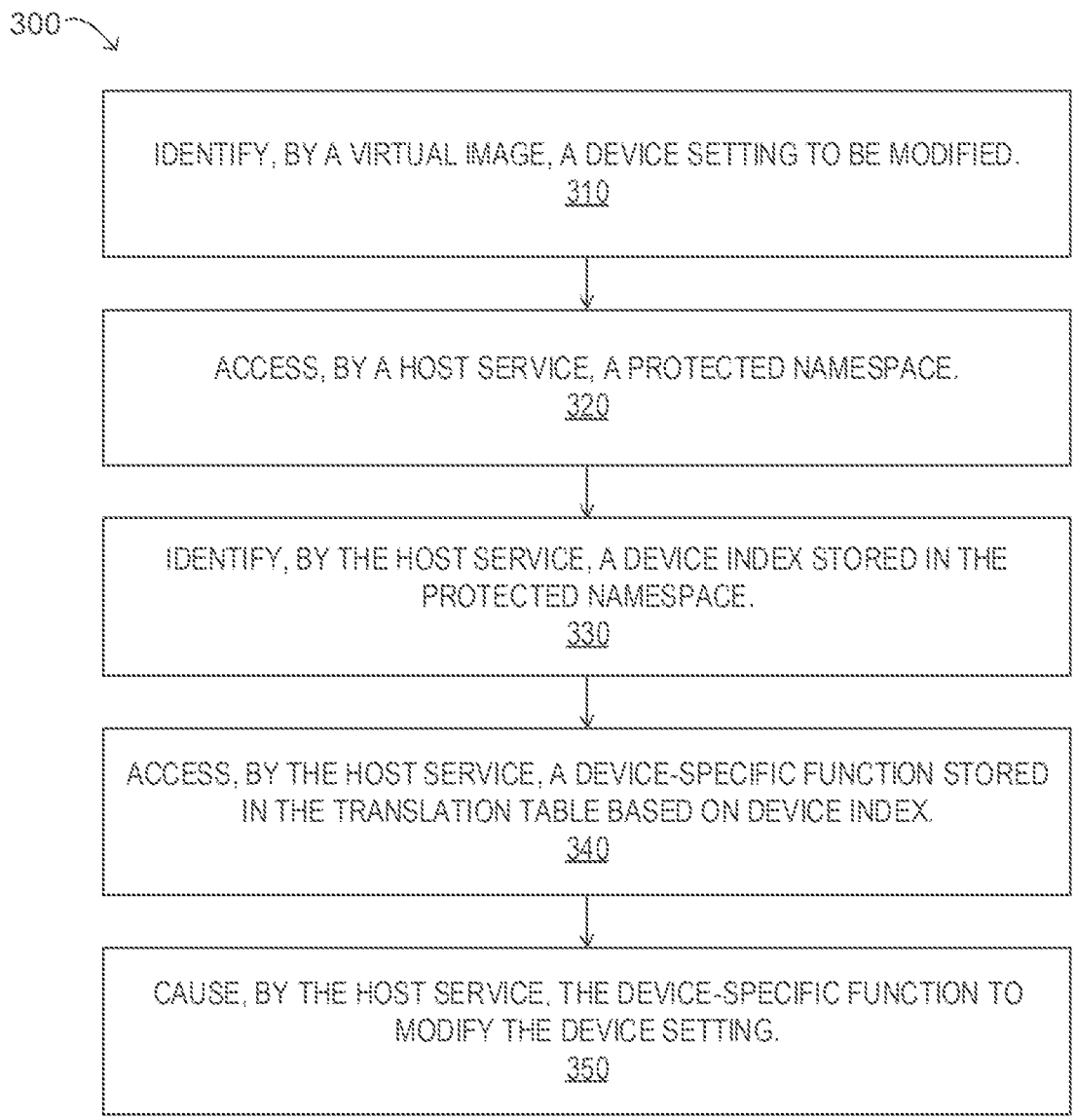
FIG. 3 is a flowchart depicting selected elements of an embodiment of a method for managing virtual services in an information handling system.

Particular embodiments are best understood by reference to FIGS. 1-3 wherein like numbers are used to indicate like and corresponding parts.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 115, which may comprise one or more processors, and system bus 121 that communicatively couples various system components to processor subsystem 115 including, for example, a memory subsystem 130, an I/O subsystem 135, a local storage resource 140, and a network interface 145. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. As shown in FIG. 1, information handling system 100 may additionally include a basic input/output system (BIOS) 105, a memory 110, an embedded operating system 120, and a virtual engine 125. In other embodiments, computing environment 155 may include additional, fewer, and/or different components than the components shown in FIG. 1.

In information handling system 100, processor subsystem 115 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 115 may interpret and/or execute program instructions and/or process data stored locally (e.g., in memory subsystem 130 and/or another component of information handling system 100). In the same or alternative embodiments, processor subsystem 115 may interpret and/or execute program instructions and/or process data stored remotely. In one embodiment, processor subsystem 115 may be or include a multi-core processor comprised of one or more processing cores disposed upon an integrated circuit (IC) chip. In other embodiments, processor subsystem 115 may be or include an integrated device (e.g., microcontroller, system on a chip (SoC), and the like) that includes memory, peripheral interfaces, and/or other components suitable for interpreting and/or executing program instructions and/or processing data.

In one embodiment, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 135 may comprise a system, device, or apparatus generally operable to receive and/or transmit data to, from, and/or within information handling system 100. I/O subsystem 135 may represent, for example, a variety of communication interfaces, graphics interfaces, video interfaces, user input interfaces, and/or peripheral interfaces. In various embodiments, I/O subsystem 135 may be used to support various peripheral devices, such as a touch panel, a display adapter, a keyboard, an accelerometer, a touch pad, a gyroscope, an IR sensor, a microphone, a sensor, a camera, or another type of peripheral device.

In one embodiment, local storage resource 140 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In one embodiment, network interface 145 may be a suitable system, apparatus, or device operable to serve as an interface between information handling system 100 and a network 190. Network interface 145 may enable information handling system 100 to communicate over network 190 using a suitable transmission protocol and/or standard, including, but not limited to, transmission protocols and/or standards enumerated below with respect to the discussion of network 190. Network 190 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 145 may enable wired and/or wireless communications (e.g., NFC or Bluetooth) to and/or from information handling system 100.

In particular embodiments, network 190 may include one or more routers for routing data between client information handling systems 100 and server information handling systems 100. A device (e.g., a client information handling system 100 or a server information handling system 100) on network 190 may be addressed by a corresponding network address including, for example, an Internet protocol (IP) address, an Internet name, a Windows Internet name service (WINS) name, a domain name or other system name. In particular embodiments, network 190 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

In one embodiment, network 190 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 190 and its various components may be implemented using hardware, software, or any combination thereof.

In one embodiment, memory 110 may comprise a system, device, or apparatus operable to retain and/or retrieve program instructions and/or data for a period of time (e.g., computer-readable media). Memory 110 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. In one embodiment, memory 110 may include one or more partitions that each store metadata (e.g., metadata 280-1 through 280-3 shown in FIG. 2) associated with virtual services (e.g., virtual services 200-1 through 200-3 shown in FIG. 2) of virtual engine 125. Memory 110 is described if further detail with respect to FIG. 2.

In one embodiment, BIOS 105 may be a suitable system, apparatus, or device operable to manage resources for information handling system 100. In particular, BIOS 105 may be or include a set of firmware instructions electronically stored within information handling system 100 that allows information handling system 100 to manage various resources and/or perform specific tasks. For example, information handling system 100 may use BIOS 105 to perform hardware initialization during a pre-boot sequence and/or to provide runtime services for other host services executing on information handling system 100. In one embodiment, BIOS 105 may generate one or more partitions in memory 110 that each store metadata associated with virtual services of virtual engine 125 during a pre-boot phase (e.g., phase A shown in FIG. 2) of information handling system 100. BIOS 105 may additionally generate a translation table (e.g., translation table 290 shown in FIG. 2) during the pre-boot phase of information handling system 100. BIOS 105 is described in further detail with respect to FIG. 2.

In one embodiment, embedded operating system 120 may be a suitable system, apparatus, or device operable to manage one or more computing tasks for information handling system 100. Specifically, embedded operating system 120 may be or include a light-weight operating system (e.g., Linux, Ubuntu, and the like) operable to manage one or more computing tasks associated with secure content deployment (e.g., bare-metal deployment of firmware updates, firmware security settings, OS-based firmware tables, Windows Management Instrumentation (WMI) Managed Object Format (MOF) files, and the like) for advanced systems management of information handling system 100. In one embodiment, embedded operating system 120 may manage one or more computing tasks associated with virtual engine 125. In particular, embedded operating system 120 may provide access to one or more hardware devices (e.g., processor subsystem 115, memory subsystem 130, network interface 145, and the like) of information handling system 100 to one or more virtual services (e.g., virtual services 200-1 through 200-3 shown in FIG. 2) executing within virtual engine 125.

Conventionally, virtual services, and/or the virtual images therein, executing within a virtual engine may be provided with access to one or more hardware devices such that each virtual image may include uniform device settings associated with the one or more hardware devices. That is, device settings associated with each virtual service, and/or the virtual images therein, may be uniform across each virtual service, and/or the virtual images therein. For example, one or more containers of a docker executing within a conventional virtual engine may each be required to perform computing tasks using the same device settings across each of the one or more containers. As such, each of the one or more containers may be forced to operate within the confines of the device settings shared amongst the one or more containers. However, maintaining uniform device settings across virtual services, and/or the virtual images therein, may limit the scope of computing tasks capable of being performed by each virtual service, and/or the virtual images therein, thereby decreasing system efficiency and diminishing overall user experience.

In contrast, embedded operating system 120 may provide virtual services, and/or the virtual images therein, with access to one or more hardware devices of information handling system 100 such that each virtual service, and/or each virtual image therein, may manage its own respective device settings. To provide access to the one or more hardware devices, embedded operating system 120 may generate a firmware virtual container (e.g., firmware virtual container 250 shown in FIG. 2) that includes one or more protected namespaces (e.g., protected namespaces 270-1 through 270-3 shown in FIG. 2) that each correspond to a virtual image (e.g., virtual images 210-1 through 210-3 shown in FIG. 2) of a virtual service executing within virtual engine 125. These protected namespaces may be used by embedded operating system 120 to provide virtual services, and/or the virtual images therein, with access to one or more device-specific functions stored in information handling system 100, thereby increasing the granularity with which device settings may be managed across virtual services. In this way, embedded operating system 120 may increase the scope of computing tasks capable of being performed by each virtual service, and/or the virtual images therein, thereby increasing system efficiency and overall user experience. Embedded operating system 120 is described in further detail with respect to FIG. 2.

In one embodiment, virtual engine 125 may be a suitable system, apparatus, or device operable to provide a virtual hosting environment for one or more virtual services. In particular, virtual engine 125 may provide secure operating-system-level virtualization for one or more isolated instances of virtual services, and/or the virtual images therein, executing within virtual engine 125. For example, virtual engine 125 may provide a virtual hosting environment for one or more dockers executing within virtual engine 125, where each docker includes one or more containers. In another example, virtual engine 125 may provide a virtual hosting environment for a hypervisor executing within virtual engine 125 that includes one or more virtual machines. In one embodiment, virtual engine 125 may include a host service (e.g., host service 240 shown in FIG. 2) operable to provide access to one or more devices of information handling system 100. For example, the host service of virtual engine 125 may be or include an Advanced Configuration and Power Interface (ACPI) service operable to access one or more device-specific functions stored in information handling system 100 and to cause the one or more device-specific functions to modify respective device settings for each virtual service, and/or the virtual images therein. Virtual engine 125 is described in further detail with respect to FIG. 2.

FIG. 2 is a block diagram of selected elements of an embodiment of an information handling system. In the embodiment illustrated in FIG. 2, information handling system 100 includes virtual engine 125, embedded operating system 120, BIOS 105, memory 110, and a translation table 290. Virtual engine 125 includes virtual services 200-1 through 200-3 that may each include virtual images (e.g., virtual images 210-1 through 210-3). As shown in FIG. 2, virtual images 210-1 through 210-3 may each include respective device settings (e.g., settings 220-1 through 220-3) and signatures (e.g., signatures 230-1 through 230-3). Virtual engine 125 may additionally include a host service 240. Embedded operating system 120 includes a firmware virtual container 250 that includes object identifiers 260-1 through 260-3 and protected namespaces 270-1 through 270-3. Memory 110 includes partitions used to store metadata 280-1 through 280-3. In the embodiment illustrated in FIG. 2, information handling system 100 may additionally include a pre-boot phase A, a translation phase B, and a runtime phase C. In other embodiments, information handling system 100 may include additional, fewer, and/or different components than the components shown in FIG. 2.

In one embodiment, metadata 280-1 through 280-3 (collectively referred to herein as "metadata 280") may be stored in respective partitions within memory 110. In particular, memory 110 may include a respective partition for each virtual service 200 installed on, or otherwise available to, information handling system 100. In one embodiment, metadata 280 stored in each partition may include various device settings and/or resources associated with the virtual service 200, or virtual services 200, to which the partition corresponds. For example, metadata 280-1 shown in FIG. 2 may correspond to virtual service 200-1 and may include device settings 220-1 through 220-3 used by virtual images 210-1 through 210-3 and/or one or more device-specific functions used to modify device settings 220-1 through 220-3. In another example, metadata 280-1 may include signatures 230-1 through 230-3 used to validate virtual images 210-1 through 210-3.

In one embodiment, BIOS 105 may create a respective partition within memory 110 for each virtual service 200 installed on, or otherwise available to, information handling system 100. In particular, BIOS 105 may dynamically determine a number of virtual services 200 installed on, or otherwise available to, information handling system 100 during pre-boot phase A and may create and/or remove respective partitions based on the number of virtual services 200 accordingly. In one embodiment, BIOS 105 may manage the number of respective partitions within memory 110 based on a memory layout associated with a previous booting process of information handling system 100. For example, BIOS 105 may determine, during pre-boot phase A, that the memory layout associated with a previous booting process included five partitions corresponding to five virtual services 200 installed on, or otherwise available to, information handling system 100. In this example, BIOS 105 may additionally determine that pre-boot phase A may have been provoked in response to an installation of a sixth virtual service 200 within virtual engine 125. Here, BIOS 105 may create a sixth partition within memory 110 corresponding to the sixth virtual service 200 installed on information handling system 100 and may store metadata 280 associated with the sixth virtual service 200 within the sixth partition. In this way, BIOS 105 may ensure that each virtual service 200 executing within virtual engine 125 may have access to metadata 280 that specifically pertains to computing tasks being performed by the virtual service 200, thereby increasing the granularity with which computing tasks may be managed across virtual services 200.

In one embodiment, BIOS 105 may create a translation table 290 during pre-boot phase A. Specifically, BIOS 105 may generate translation table 290 based on metadata 280 stored in memory 110 during a Boot Device Selection (BDS) phase of pre-boot phase A. For example, translation table 290 may be or include a virtual hand-off block (HOB) that includes a memory map to metadata 280 stored in memory 110 to be passed, or otherwise exposed, to embedded operating system 120 for use during translation phase B shown in FIG. 2. In one embodiment, translation table 290 may include separate entries within a table that each correspond to a partition within memory 110. Here, each of the separate entries may include metadata 280, or translations of the metadata 280, associated with the partition in which the metadata 280 is stored. For example, each of the separate entries stored in translation table 290 may include an index to a device, or a "device index," that points to one or more device-specific functions used to modify device settings of the device. These one or more device-specific functions may be accessed by host service 240 (e.g., during runtime phase C shown in FIG. 2) to modify respective device settings 220 associated with a device, or devices, for each virtual image 210 within virtual service 200.

In one embodiment, embedded operating system 120 may boot during a translation phase B and may generate firmware virtual container 250 based on entries stored in translation table 290. In particular, embedded operating system 120 may generate protected namespaces 270 that each correspond to a virtual image 210 within virtual service 200. That is, each of the protected namespaces 270 generated by embedded operating system 120 during the translation phase B may be associated with a respective virtual image 210 and may include metadata used to support the virtual image 210 and to provide the virtual image 210 with access to one or more device-specific functions stored in information handling system 100 (e.g., in translation table 290). In one embodiment, metadata stored in each protected namespace 270 may include device settings 220 used by a virtual image 210 and a signature 230 used to validate the virtual image 210. Metadata stored in each protected namespace 270 may additionally include one or more unique identifiers, or "device identifiers," that each correspond to a device available to virtual images 210. Here, device identifiers may be used to index device attributes associated with the device within each protected namespace 270. In one embodiment, the device attributes associated with a device may include a device index that points to one or more device-specific functions stored in translation table 290. In the embodiment illustrated in FIG. 2, each protected namespace 270 may be associated with a unique identifier, or an "object identifier," that corresponds to a respective virtual image 210 within a virtual service 200. During translation phase B, embedded operating system 120 may generate, both, an object used to represent a virtual image 210 and an object identifier 260 used to identify the protected namespace 270 associated with the object that represents the virtual image 210. In this way, respective protected namespaces 270 within firmware virtual container 250 may be readily identified by embedded operating system 120 using object identifiers 260.

In one embodiment, one or more virtual services 200 may be executed during a runtime phase C of information handling system 100. Specifically, one or more virtual images 210 within a virtual service 200 may be executed during runtime phase C to perform one or more computing tasks for information handling system 100. As shown in FIG. 2, each virtual image 210 within a virtual service 200 may include device settings 220 and a signature 230. In one embodiment, signature 230 may be or include a hash (e.g., embedded in the object identifier 260 associated with virtual image 210) used by embedded operating system 120 to validate virtual image 210. In one embodiment, virtual services 200 executing in virtual engine 125 may be or include virtual operating systems, dockers, hypervisors, virtual boxes, and/or virtual machine (VM) ware. In one embodiment, virtual images 210 executing within virtual services 200 may be or include guest operating systems, containers, and/or virtual machines. In other embodiments, virtual services 200 and virtual images 210 may be or include any combination of virtual software and/or hardware elements suitable for performing one or more computing tasks for information handling system 100.

In one embodiment, virtual images 210 may identify device settings 220 to be modified while performing one or more computing tasks for information handling system 100. For example, virtual image 210-1 may identify that a hyper-threading device setting associated with a CPU device may require modification from a hyper-threading level 1 to a hyper-threading level 2 to complete one or more computing tasks. Similarly, virtual image 210-2 may identify that a hyper-threading device setting associated with the CPU device may require modification from a hyper-threading level 2 to a hyper-threading level 4. In this example, because each virtual image 210 within a virtual service 200 may include its own respective device settings 220, virtual image 210-1 may request a hyper-threading level 2 device setting 220-1 and virtual image 210-2 may request a hyper-threading level 4 device setting 220-2 for the CPU device.

In one embodiment, virtual image 210 may send a request to modify device settings 220 to host service 240. In one embodiment, the request sent from virtual image 210 may include an object identifier 260 and a signature 230 associated with the virtual image 210 requesting the modified device settings 220. In this embodiment, the request may additionally include a device identifier associated with the device having device settings 220 to be modified and one or more desired device settings to be applied for the modification. In one embodiment, host service 240 may be or include an ACPI service. In other embodiments, host service 240 may be or include a runtime (RT) service, an application programming interface (API) service, and/or any other host service suitable for communicating with embedded operating system 120.

In one embodiment, host service 240 may receive the request to modify device settings 220 from virtual image 210. In response to receiving the request, host service 240 may access the protected namespace 270 associated with the virtual image 210 requesting the modified device settings 220. To access the protected namespace 270, host service 240 may first ensure that the virtual image 210 requesting the modified device settings 220 has been validated. In one embodiment, host service 240 may identify the signature 230 included in the request to modify device settings 220 and may verify that the signature 230 matches the signature 230 stored in protected namespace 270. In another embodiment, host service 240 may verify that the signature 230 included in the request to modify device settings 220 matches the signature 230 stored in memory 110 as metadata 280. Upon determining that the virtual image 210 has been validated, host service 240 may identify an object identifier 260 included in the request to modify device settings 220 and may select the protected namespace 270—from the protected namespaces 270 within firmware virtual container 250—having a matching object identifier 260 (i.e., associated with the object that represents the virtual image 210). In one embodiment, host service 240 may identify that the signature 230 included in the request to modify device settings 220 does not match the signature 230 stored in protected namespace 270 and/or memory 110, or that the request does not include a signature 230, and may ignore the request to modify device settings 220 given that the virtual image 210 has not been validated.

In one embodiment, host service 240 may identify a device identifier included in the request to modify device settings 220 and may use the device identifier to locate device attributes (stored in protected namespace 270) associated with the device having device settings 220 to be modified. In particular, host service 240 may use the device identifier to identify a device index stored in protected namespace 270 pointing to one or more device-specific functions associated with the device stored in translation table 290.

Upon identifying the device index stored in protected namespace 270, host service 240 may use the device index to access the one or more device-specific functions stored in translation table 290. That is, host service 240 may access the one or more device-specific functions associated with the device having device settings 220 to be modified based on the device index. Once accessed, host service 240 may cause the one or more device-specific functions to modify the device settings 220 of the device. In particular, host service 240 may cause the one or more device-specific functions to execute using one or more desired device settings to be applied for the modification (e.g., as specified by the virtual image 210). In this way, the one or more device-specific functions may modify device settings 220 on behalf of the host service 240 without requiring access to memory 110, thereby increasing overall system security.

FIG. 3 is a flowchart depicting selected elements of an embodiment of a method for managing virtual services in an information handling system. It is noted that certain operations described in method 300 may be optional or may be rearranged in different embodiments.

Method 300 may begin at step 310, where a virtual image of a plurality of virtual images of a virtual service may identify a device setting to be modified. The device setting may be associated with a device of the information handling system. Each of the plurality of virtual images may having respective device settings. For example, virtual images 210 may identify device settings 220 to be modified while performing one or more computing tasks for information handling system 100 as described above with respect to FIG. 2. In step 320, a host service may access a protected namespace of a plurality of namespaces. The protected namespace may be associated with the virtual image. For example, host service 240 may access the protected namespace 270 associated with the virtual image 210 requesting the modified device settings 220 as described above with respect to FIG. 2. In step 330, the host service may identify a device index stored in the protected namespace. The device index may point to a device-specific function associated with the device and may be stored in a translation table. For example, host service 240 may identify a device index stored in protected namespace 270 pointing to one or more device-specific functions associated with the device stored in translation table 290 as described above with respect to FIG. 2. In step 340, the host service may access the device-specific function stored in the translation table based on the device index. For example, upon identifying the device index stored in protected namespace 270, host service 240 may use the device index to access the one or more device-specific functions stored in translation table 290 as described above with respect to FIG. 2. In step 350, the host service may cause the device-specific function to modify the device setting. For example, host service 240 may cause the one or more device-specific functions to execute using one or more desired device settings to be applied for the modification (e.g., as specified by the virtual image 210) as described above with respect to FIG. 2.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for managing a virtual service in an information handling system, the method comprising:
    identifying, by a virtual image of a plurality of virtual images of the virtual service, a device setting to be modified, the device setting associated with a device of the information handling system, each of the plurality of virtual images having respective device settings;
    accessing, by a host service of the virtual service, a protected namespace of a plurality of protected namespaces, the protected namespace associated with the virtual image;
    identifying, by the host service, a device index stored in the protected namespace, the device index pointing to a device-specific function associated with the device, the device-specific function stored in a translation table;
    accessing, by the host service, the device-specific function stored in the translation table based on the device index; and
    causing, by the host service, the device-specific function to modify the device setting.

2. The method of claim 1, wherein accessing the protected namespace associated with the virtual image comprises:
    identifying, by the host service, a signature associated with the virtual image, the signature indicating that the virtual image has been validated;
    determining, by the host service, that the virtual image has been validated based on the signature;
    identifying, by the host service, an object identifier associated with the virtual image; and
    selecting, by the host service, the protected namespace from the plurality of protected namespaces based on the object identifier.

3. The method of claim 1, wherein identifying the device index stored in the protected namespace comprises:

identifying, by the host service, a device identifier associated with the device having the device setting to be modified; and accessing, by the host service, device attributes associated with the device stored in the protected namespace based on the device identifier, the device attributes including the device index.

4. The method of claim 1, wherein each of the plurality of protected namespaces is associated with a respective virtual image of the plurality of virtual images.

5. The method of claim 1, wherein each of the plurality of protected namespaces is generated by an embedded operating system of the information handling system during a translation phase of the information handling system.

6. The method of claim 1, wherein the translation table is generated by a basic input/output system (BIOS) of the information handling system, the translation table based on metadata stored in a plurality of partitions within in a memory of the information handling system, each of the plurality of partitions associated with a respective virtual image of the plurality of virtual images.

7. The method of claim 6, wherein the translation table is generated by the BIOS during a pre-boot phase of the information handling system.

8. One or more computer-readable non-transitory storage media embodying software that is operable when executed to:

identify, by a virtual image of a plurality of virtual images of a virtual service of an information handling system, a device setting to be modified, the device setting associated with a device of the information handling system, each of the plurality of virtual images having respective device settings;

access, by a host service of the virtual service, a protected namespace of a plurality of protected namespaces, the protected namespace associated with the virtual image;

identify, by the host service, a device index stored in the protected namespace, the device index pointing to a device-specific function associated with the device, the device-specific function stored in a translation table;

access, by the host service, the device-specific function stored in the translation table based on the device index; and cause, by the host service, the device-specific function to modify the device setting.

9. The media of claim 8, wherein to access the protected namespace associated with the virtual image, the software is further operable when executed to:

identify, by the host service, a signature associated with the virtual image, the signature indicating that the virtual image has been validated;

determine, by the host service, that the virtual image has been validated based on the signature;

identify, by the host service, an object identifier associated with the virtual image; and select, by the host service, the protected namespace from the plurality of protected namespaces based on the object identifier.

10. The media of claim 8, wherein to identify the device index stored in the protected namespace, the software is further operable when executed to:

identify, by the host service, a device identifier associated with the device having the device setting to be modified; and access, by the host service, device attributes associated with the device stored in the protected namespace based on the device identifier, the device attributes including the device index.

11. The media of claim 8, wherein each of the plurality of protected namespaces is associated with a respective virtual image of the plurality of virtual images.

12. The media of claim 8, wherein each of the plurality of protected namespaces is generated by an embedded operating system of the information handling system during a translation phase of the information handling system.

13. The media of claim 8, wherein the translation table is generated by a basic input/output system (BIOS) of the information handling system, the translation table based on metadata stored in a plurality of partitions within in a memory of the information handling system, each of the plurality of partitions associated with a respective virtual image of the plurality of virtual images.

14. The media of claim 13, wherein the translation table is generated by the BIOS during a pre-boot phase of the information handling system.

15. A computing environment, comprising:

an information handling system including one or more processors; and one or more computer-readable non-transitory storage media coupled to one or more of the processors and comprising instructions operable when executed by one or more of the processors to cause the system to:

identify, by a virtual image of a plurality of virtual images of a virtual service of the information handling system, a device setting to be modified, the device setting associated with a device of the information handling system, each of the plurality of virtual images having respective device settings;

access, by a host service of the virtual service, a protected namespace of a plurality of protected namespaces, the protected namespace associated with the virtual image;

identify, by the host service, a device index stored in the protected namespace, the device index pointing to a device-specific function associated with the device, the device-specific function stored in a translation table;

access, by the host service, the device-specific function stored in the translation table based on the device index; and cause, by the host service, the device-specific function to modify the device setting.

16. The computing environment of claim 15, wherein to access the protected namespace associated with the virtual image, the processors are further operable when executed to:

identify, by the host service, a signature associated with the virtual image, the signature indicating that the virtual image has been validated;

determine, by the host service, that the virtual image has been validated based on the signature;

identify, by the host service, an object identifier associated with the virtual image; and select, by the host service, the protected namespace from the plurality of protected namespaces based on the object identifier.

17. The computing environment of claim 15, wherein to identify the device index stored in the protected namespace, the processors are further operable when executed to:

identify, by the host service, a device identifier associated with the device having the device setting to be modified; and access, by the host service, device attributes associated with the device stored in the protected namespace based on the device identifier, the device attributes including the device index.

18. The computing environment of claim 15, wherein each of the plurality of protected namespaces is associated with a respective virtual image of the plurality of virtual images.

19. The computing environment of claim 15, wherein each of the plurality of protected namespaces is generated by an embedded operating system of the information handling system during a translation phase of the information handling system.

20. The computing environment of claim 15, wherein the translation table is generated by a basic input/output system (BIOS) of the information handling system, the translation table based on metadata stored in a plurality of partitions within in a memory of the information handling system, each of the plurality of partitions associated with a respective virtual image of the plurality of virtual images.

* * * * *